United States Patent [19]
Cordova

[11] Patent Number: 5,972,092
[45] Date of Patent: Oct. 26, 1999

[54] LIGHTWEIGHT MODELING PLAY COMPOSITION

[75] Inventor: Abimael Cordova, Downey, Calif.

[73] Assignee: Mattel, Inc., El Segundo, Calif.

[21] Appl. No.: 09/130,571

[22] Filed: Aug. 7, 1998

[51] Int. Cl.⁶ .............................. C08L 97/02; C08L 3/02; C08L 89/00

[52] U.S. Cl. .................................. 106/126.3; 106/127.1; 106/132.1; 106/133.1; 106/134.1; 106/134.2; 106/162.5; 106/164.4; 106/164.57; 106/164.5; 106/164.01

[58] Field of Search ............................ 106/126.3, 127.1, 106/132.1, 133.1, 134.1, 134.2, 162.5, 164.01, 164.4, 164.5, 164.51

[56] References Cited

U.S. PATENT DOCUMENTS

| | | | |
|---|---|---|---|
| 4,386,964 | 6/1983 | Herbert | 106/150 |
| 4,629,751 | 12/1986 | Montgomery | 523/219 |
| 5,157,063 | 10/1992 | Wetherell | 524/55 |
| 5,171,766 | 12/1992 | Mariano et al. | 523/218 |
| 5,498,645 | 3/1996 | Mariano et al. | 523/218 |
| 5,628,821 | 5/1997 | Bowling et al. | 106/126.1 |

OTHER PUBLICATIONS

Ise et al, JP405156125A, "Wood–Filled Phenol Resin Molding Material", 1993.

*Primary Examiner*—David Brunsman
*Attorney, Agent, or Firm*—Robert W. Mulcahy

[57] ABSTRACT

The invention is directed to a lightweight flour-based modeling dough composition of matter having unique pliability and moldability. The composition comprises flour, water, and glass microsphere bubbles in an amount of from about 1 to 15% by weight. The composition is lightweight and capable of being used as a kneading compound, as well as being moldable and stretchable for use in modeling play activities. The composition is based on a cohesive and substantially nondrying binder composition that is appropriate for child use. The invention is also directed to a method of making the instant flour based modeling composition of matter.

18 Claims, No Drawings ic and nonstretchable over significant lengths. Additionally, these modeling clays are messy and frequently have oils and other staining ingredients which are difficult to remove from carpets and fabrics. Elastomeric silicone-based play compositions are known and are essentially designed to be stretched, as well as to be rolled into a ball which has a high degree of elasticity or "bounce" under suddenly applied stress. However, silicone-based modeling compositions or puttys are generally known to have an unpleasant feel and have limited stretch capabilities, thereby limiting the material to a narrow field of play activity. Moreover, silicone puttys cannot be readily removed from fabric and carpets and, therefore, are not preferred materials for use by children.
LIGHTWEIGHT MODELING PLAY COMPOSITION

TECHNICAL FIELD OF THE INVENTION

The present invention relates to a modeling composition of matter for use as a play material particularly for young children. The present composition is capable of being used as a moldable material capable or maintaining its shape. Because it is based on a wood or grain flour or other starch composition, it is safe and suitable for use by children if accidentally ingested and can be washed from fabrics and carpets with water.

BACKGROUND OF THE INVENTION

Through the years, play compositions of different types have been provided by practitioners in the toy arts to amuse children and adults and to aid in the development of manual skills and dexterity, as well as creativity. While the variety of such play material compositions is virtually endless, all generally involve the use of free-forming or malleable materials, such as oil base or water base gums and gel compounds which may be manipulated and shaped by the user. Certain materials have been provided which are moldable and tend to retain their shapes, such as modeling clay or the like. Others, however, have been provided which are looser and more free-flowing, such as novelty play materials and compositions. Still others are gel-like and provide interesting characteristics, such as shaking or quivering similar to gelatin dessert products.

Regardless of the type of play compositions used, it has remained imperative that such materials be safe for young children. Safety requirements have evolved through the years as safety concerns have grown. Generally, safety requirements mandate that play material compositions be nonirritating to the skin or eyes or the like, and be nontoxic if ingested. Additional requirements have been expected of these materials to avoid damage to clothing, upholstery fabric, or carpeting.

Play compositions having molding or modeling characteristics by which a child can represent people or objects are well known and generally comprise products of mineral origin, i.e., clay products, or vegetable origin, i.e., starch products. These particular materials are, in general, nonelastic and nonstretchable over significant lengths. Additionally, these modeling clays are messy and frequently have oils and other staining ingredients which are difficult to remove from carpets and fabrics. Elastomeric silicone-based play compositions are known and are essentially designed to be stretched, as well as to be rolled into a ball which has a high degree of elasticity or "bounce" under suddenly applied stress. However, silicone-based modeling compositions or puttys are generally known to have an unpleasant feel and have limited stretch capabilities, thereby limiting the material to a narrow field of play activity. Moreover, silicone puttys cannot be readily removed from fabric and carpets and, therefore, are not preferred materials for use by children.

Grain or wood flour play compositions are known in the art as being child-user friendly. Specifically, flour or other starch materials have been found to be harmless if accidentally ingested, have no unpleasant odor or feel, and are readily removable from carpet or fabrics. However, most flour or starch modeling compositions require the use of flour and other fillers to give physical integrity to the materials so as to enable the retention of detail or shape and consequently are dense and heavy from the cumulative amounts of binder and flour. Moreover, flour modeling doughs are water based and an inherent problem of such doughs is the loss of volume (shrinkage) upon drying.

One attempt to overcome the shrinking or drying problem has been to incorporate large proportions of filler in the dough mixture which technique has been ineffective in significantly holding water. Moreover, large amounts of filler causes flaking, cracking, or crumbling of the dough composition.

Yet another problem associated with conventional water/flour based doughs is that they are heavy and hard to manipulate. Dense heavy play modeling doughs are awkward and the child is limited in the types of shapes that can be created without the dough falling apart.

Recognizing the need to provide a more versatile play modeling dough material, the present invention was configured. Specifically, there was significant interest in providing a modeling dough material that is kneadable, moldable, pliant and ductile enough to avoid tearing during use; that can be used for long periods of time without drying to the point that it becomes unusable; that would not be harmful if accidentally ingested; and that exhibits a pleasant tactile feel with no unpleasant odor. It was further sought to have a play material that is light weight; which can be cleaned up and removed from carpets and fabrics with water; and which can be molded and maintain detail until it is reworked. It was also important to produce a composition exhibiting all of the above properties while being moderate in cost.

SUMMARY OF THE INVENTION

By "modeling compounds" is meant a composition which is of a soft pliable consistency such that it can be modeled into any desired shape or form. The modeling compound of this invention includes the characteristics that it is clean, non-sticky, non-staining, non-toxic and very slow drying. It is also desirable that the composition has preservative properties.

The discovery of the present invention is that one may formulate a superior modeling dough play composition by combining a binder comprised of certain amounts of flour or starch, lightweight glass bubble microspheres or hollow beads, and water in certain amounts to form a modeling composition of completely unexpected character in that it possesses an exceptional tactility, pliability, and ductility for molding. The modeling dough play composition has sufficient stretchability to enable manipulation and pulling, is sufficiently ductile to avoid tearing and can form permanent objects. The play composition of the present invention has the additional qualities of being pleasant to the touch with no tendency to stick to the hands and retains water content (hence, minimal shrinkage) over a relatively long period of time.

More particularly, the invention relates to a modeling dough composition consisting of flour, water, and lightweight glass bubble microspheres and a humectant; and optionally humectants (or emollients), preservatives, and colorants. In contrast to conventional play clays, putties or doughs, the instant modeling compounds can be easily manipulated and molded with superb sharpened detail. The present composition can be easily smoothed out when two pieces are joined together and no crease will be seen. The critical feature of the instant composition is the use of from 8 to 20% by weight of lightweight glass bubble microspheres as a filler for the present composition to render the material moldably functional, lightweight and of acceptable tactility and ductility for manipulative modeling. Though best stored in a container, the instant composition requires a long time to harden even if left in open air for a prolonged length of time.

In one preferred form, the modeling composition is comprised of a binder having from about 30 to 40% by (total compositional) weight of a wood or grain flour and from about 8 to 20% by (total compositional) weight of glass microspheres (3M K-25 "Glass Bubbles"). The composition further includes 5 to 15% by weight of an emollient and/or humectant, approximately 1 to 5% of an aqueous or organo-soluble binder thickener (guar gum), and from 30 to 40% by weight of water.

Even more preferably and precisely, the present invention is directed to a modeling composition comprising from about:

a) 30 to 40% by weight of a wood or grain flour;

b) 10 to 15% by weight of glass bubble microspheres;

c) 5 to 15% by weight of an emollient and humectant;

d) 1 to 5% of a polysaccharide gum thickener; and e) 30 to 40% water.

The present modeling composition is prepared by:

a) rapidly mixing a composition of flour, preservatives, colorants and a polysaccharide gum thickener at room temperature, to form a dispersed powdery mixture;

b) subsequently adding water and lightweight glass bubble microspheres fillers in an amount not to exceed 20% of the ultimate compositional weight to the agitated powdered mixture and heating the resulting aqueous mixture during mix agitation to between 180 to 200° F.; and c) continue mixing at the elevated temperature until formation of a uniform dough.

DETAILED DESCRIPTION OF THE INVENTION

The present composition is the combination of a number of ingredients which synergistically provide for the desirable properties of the instant play composition invention recited above. The primary ingredients of the present composition are flour, water, a thickener and certain amounts of lightweight glass bubble microspheres as a filler. Also preferred are preservatives, used to prevent microbial growth, salt stabilizers, fragrances, and colorants. The preferred composition comprises from 30 to 40% flour, from 8 to 20% of hollow composite microspheres, 20 to 30% of an emollient and/or humectant; from 1 to 5% of an aqueous or organosoluble binder thickener (guar gum), and from 30 to 40% by weight of water.

One of the problems with a flour/water based dough or modeling composition is the density created by the mixture which is overcome by the present invention. Dry shrinkage is another problem inherent in water/flour based doughs disclosed in the prior art and also overcome by the present invention. The instant composition overcomes these problems by incorporating a lightweight microsphere filler that bonds with the polysaccharide molecular structure of the flour base to form an adequate matrix. Any water evaporating upon drying of the composition will occur without substantial shrinking of the bulk composition. The hollow composite lightweight microspheres are the reason for the exceptional results obtained with the instant modeling play composition. These lightweight spheres are functionally desirable because they are lightweight (having a density of about 0.13 g/cc.) and accordingly lower the density of the modeling dough.

The glass bubble composite microsphere filler incorporated into the instant modeling dough is especially helpful in preventing the modeling material from shrinking on drying should the modeling dough be over exposed to the environment. While the weight percent of water in the present invention is high (30 to 40%), the actual partial volume of water is relatively low due to the relatively high density of water (1 g/cc) and low density of the microspheres. Consequently, the hollow microspheres constitute the majority of the volume of the dough. The flour and the microspheres bind together to give a sufficient structural integrity for molding. Therefore when water evaporates, the dough does not lose a large percentage of its total volume. It has been found herein that the functional range of microspheres is from 8 to 20% by weight of the total composition; amounts less than 8% leave the flour/water dough tacky due to excess water while microspheres in excess of 20% by weight causes flaking, loss of dough body, and limited ductility (tearing) and pliability. Even more Preferred amounts of lightweight hollow microspheres in the instant dough composition are from about 10 to 18% and optimal concentrations are from about 10 to 15% by weight of the total dough composition.

The preferred lightweight fillers are glass bubble composite microspheres of about 30 to 60 micron diameter and having a wettable particulate coating. The optimum diameter for the instant invention is 50 micron diameter. Microspheres with larger diameters are workable but may give the dough a grainy texture. Microspheres with a smaller diameter may result in a heavier dough but result in smoother texture. Therefore the choice of particle size herein is determined by the present desired end properties of pliability and moldability for child use.

The microsphere coating facilitates the wetting of the microspheres by the aqueous liquid ingredients of the dough. The coating also contributes to the smooth feel and stickiness in the final product, thereby allowing easy manipulation of the dough. The preferred coating is calcium carbonate. Other coatings include talc, alumina trihydrate, and titanium dioxide, as well as other functional components such as pigments or dyes.

One preferred coated microsphere is sold under the tradename K-25 by 3M Corporation. K-25 is an ultra low density, resilient, polymeric microsphere coated with calcium carbonate. It is a lightweight filler that reduces density of the dough and occupies the volume not attributable to water and resin. The resilient polymeric microspheres are shear stable and impact resistant, thus remaining intact under formulation conditions. Other microsphere fillers useful in the composition of the invention have densities ranging from 0.10 to 0.75 g/cc, and include the wettable particulate coatings discussed above.

Other workable microspheres are available in various sizes and densities. Ceramic microspheres range in diameter form 15 to 40 microns and have a density of about 0.7 g/cc. Expanded polystyrene beads may be used and are obtained from very fine granules of polystyrene containing a gas, a technique well known in the art. However, the ceramic microspheres give the dough a grainier texture and a brownish coloring. Silica alumina alloy microspheres range in diameter from 1 to 1000 microns and have densities ranging from 2.1 to 2.5 g/cc, depending on the wall thickness. Plastic microspheres made from a variety of materials are available in sizes ranging from 1 to 1000 micron diameter and densities ranging from 0.13 to 0.95 g/cc. Any of these materials, or combination of such materials may be employed for the purpose of achieving particular combinations of properties.

The primary composition of the modeling dough disclosed herein incorporates the following additional optional components: (1) a humectant; (2) a preservative; (3) a colorant; and (4) a binder or thickening agent.

The humectant is not an essential component, but it is preferably added to help plasticize the flour binder component of the mixture. As noted, the present invention is directed to an moldable dough composition of matter which remains moldable and kneadable throughout its effective life. In achieving these characteristics, it is imperative that the amount of water lost during play or storage be insignificant in comparison to the effect that the humectant has upon the composition. In effect, the emollients contemplated for use herein provide body to the flour and microspheres and function as plasticizers to maintain the soft stretch quality of the composition. Humectants prevent the loss of water to any significant extent so that the user may reconstitute the mass to its original softness merely by wetting one's hands with water. Without the humectant, the disclosed modeling dough may be more brittle and the use of a humectant improves the workability of the disclosed modeling dough. There is a wide variety of workable humectant materials, however, the preferred humectants are triglycerol and glycerin because they are superior plasticizers in this system and produce a dough with a smooth texture. Alternative, yet satisfactory, humectants are propylene glycols, poly (ethylene glycols) (i.e. Carbowax 200) and diethylene glycol. The present composition preferably includes 5 to 15% by weight of an emollient and humectant such as glycerine, polyglycol, and/or polypropylene glycol.

A desirable additive that increases shelf-life is a preservative, and a wide variety of such materials is available commercially. It is contemplated that a preservative be employed in amounts of up to 3% by weight. As such, 0.1 to 2% by weight of a suitable preservative, such as methyl, ethyl, butyl and propyl parabens can be incorporated in the present composition. Additionally, salts such as sodium carbonate, sodium chloride, and aluminum sulfate can be employed as preservatives.

If no colorant is used, the resulting dough is white. A white dough has many applications because it can be easily painted by children with water-base paints. Also, white is an attractive color in itself and has many applications without the need for painting. If a colored dough is desired, a variety of pigments and dyes may be used. Fluorescent doughs are especially attractive to children. Fluorescent pigments that work especially well include those sold under the trade names Aurora Pink T-1 1-3, Saturn Yellow T-17-N and Signal Green T-18-3. Without the pigment or dye, the composition is basically dough white, while with up to 6% by weight of a suitable pigment or dye the play material can be made to take on an array of vivid colors which are magnified by the stretch characteristics of the elastic polymer composition. Typical pigments and colorants include synthetic organic colorants sold as the T-series by the Day Glow Corporation of South Gate City, Calif. Other pigments which can be used include sodium aluminum sulpho silicate sold as MR 582 by the Cleveland Pigment Corp. of Cleveland, Ohio; polyamide condensates with organic dyes with less than 2% phthalocyanine; and tetra-chloro-zincate sold by the Day Glow Corporation.

Finally, the present invention contemplates the use of an aqueous or organo-soluble thickener such as guar gum, hydroxypropyl cellulose, hydroxyalky guar, propylene glycol alginate, gum karaya, and similar materials, in an amount of from 1 to 5% by weight.

The present composition is based upon a water-soluble flour base polymer of average molecular weight in combination with specific amounts of microspheres which provides hydrogen bonding of the alcohol moieties of the flour polysaccharide natural polymer, and, in combination with the other ingredients herein described produces a play modeling material which is virtually unlimited in its application, as the play material is e, moldable, pliant and reasonably stretchable, nondrying, and nontoxic.

The instant play ma terial contemplates using an amount of water necessary to achieve a pleasant, smooth, nonstick feel and elasticity in the instant flexible polymeric play material of the instant invention. The min imum amount of water is 30% by weight, while the maximum water content is 40% by weight. Water content below the minimum renders the composition too dry with loss of stretchability, while water in excess of 40% renders the material free-flowing and gooey. Equally important is the amount of lightweight microspheres to help maintain a minimum water level to sustain the unique stretch and pliancy characteristics of the present moldable polymer composition. To further prevent drying of the instant elastic composition, it is necessary that between 5 to 15% by weight of a humectant be present. It is the combination of all these ingredients in their cited quantities which generates a moldable play modeling polymer composition having unique stretch and molding characteristics.

It is within the purview of the present invention to employ a very small amount of lubricant or slip agent which acts as a process aid in combining the various ingredients. Suitable lubricants include mineral oil, paraffin, amide wax or oxidized polyethylene wax in an amount of up to 2% by weight.

A particularly useful composition was prepared having the following ingredients:

| Ingredient | Percent by Weight |
| --- | --- |
| Water | 35% |
| K-25 Glass Bubbles | 13% |
| Unbleached Flour | 32% |
| Glycerine | 10% |
| Pigment | 3% |
| Preservative | 3% |
| Thickener | 2% |
| Masking agents, stabilizers, and other pigments | 3% |

The instant invention includes a process for producing the composition, which process is set forth in the flow diagram of Table 1. The basic material is formed of flour which is mixed with guar gum, pigment, preservative, and stabilizer and charged into a mixer. After completely mixing and dispersing the flour and other ingredients, water, mineral oil, a fragrance, and salt stabilizers are added to the flour mixture in the mixer tank and the temperature of the aqueous solution is raised to between 180° F. to 200° F. and held in that temperature range for approximately thirty minutes with complete mixing until a completely uniform dough is formed.

TABLE 1

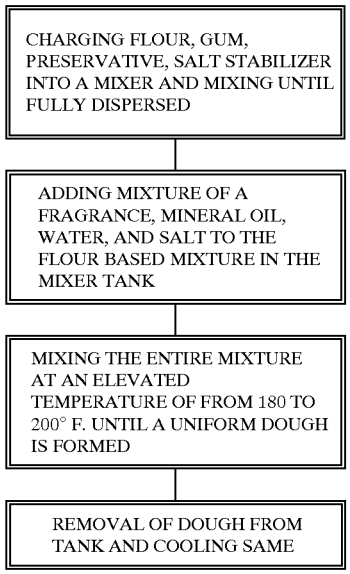

The flour based mixture so prepared is cooled to room temperature and a premixture of more pigment, masking agents and preservatives are added and mixed until color is dispersed uniformly and a homogeneous composition is achieved.

The present invention teaches a substantially nondrying moldable modeling dough composition. The novelty of this invention is rooted in the use of lightweight microspheres binder, e.g., glass bubble microspheres in combination with a greater amount of wood or grain based flour. Because the present invention relies strongly on the hydrogen bonding of the glass bubble microspheres alcohol moieties of the polysaccharide flour molecules to hold the water and prevent drying, the range of functionality in compatible materials which can be selected and appropriated to contribute other qualities to the composition such as lubricity, stretch, stiffness, and further water retention. Certain other polyglycols, such as solid polyethylene glycols, glycol di-2-ethylhexanoate, for example, can also function as softening agents or emollients or plasticizers in the present composition. As indicted above and here repeated, an emollient is regarded as a material whose primary ability or attribute is to soften or plasticize. It can soften the flour dough compound but also be regarded as the material that softens and is soothing to the hands.

The compositions of the present invention possess a unique combination of properties, including both a high degree of stretchability and a high degree of pliability when stress is applied. They do not flow appreciably under a rapid blow, but will flow readily under the application of a low, steady pressure. Other properties include excellent stability throughout a very wide temperature range. Thus, as a base for play compositions, it has application for use by children, both indoors and outdoors in all climates and seasons. Most importantly, the flour based components of these novel compositions are nontoxic and, therefore, are safe for use by children of all ages.

Having thus described the principals of the invention, together with illustrative embodiments thereof, it is to be understood that although specific terms are employed, they are used in a generic and descriptive sense and not for the purpose of limitation, the scope of the invention being set forth in the following claims.

What is claimed:

1. A modeling composition of matter comprising a binder comprised of flour binder and lightweight microsphere fillers in an amount of from 8 to 20% by weight of the total composition.

2. The modeling composition of claim 1 wherein the microspheres are glass bubble microspheres.

3. The modeling composition of claim 2 wherein the glass bubble microspheres are present in an amount of 10 to 15 percent by weight.

4. The polymeric composition of claim 2 further comprising from 0.1 to 2% by weight of a preservative.

5. The polymeric composition of claim 4 wherein the preservative comprises a member selected from the group consisting essentially of methylparaben, ethyl paraben, butyl paraben, propyl paraben, and sodium chloride.

6. The polymeric composition of claim 2 wherein said aqueous or organo-soluble thickener comprises a member selected from the group consisting of guar gum, hydroxypropyl cellulose, hydroxyalky guar, propylene glycol alginate and guar karaya.

7. The modeling composition of claim 1 wherein there is from about 30 to 40% by weight of flour, and from about 15% by weight of an emollient and humectant, 1 to 5% of an aqueous or organo soluble polysaccharide gum thickener, and 30 to 40% water, said composition being moldable, kneadable, stretchable, and nondrying throughout its effective life.

8. The polymeric composition of claim 7 wherein said humectant comprises a member selected from the group consisting of glycerine, polyglycol, and propylene glycol.

9. polymeric composition of claim 1 further comprising up to 6% by weight of a pigment or dye.

10. The polymeric composition of claim 1 further comprising up to 2% of a lubricant comprising a member selected from the group consisting of mineral oil, paraffin, amide wax, and oxidized polyethylene wax.

11. A kneading and modeling composition comprising from about:
    a) 30 to 40% by weight of a polysaccharide based binder comprised of wood or grain flour;
    b) 8 to 20% by weight of lightweight microspheres or beads;
    c) 5 to 15% by weight of an emollient and humectant;
    d) 1 to 5% of a polysaccharide gum thickener; and
    e) 30 to 40% water.

12. The composition of claims 11 wherein the microspheres are glass bubble microspheres.

13. The composition of claim 12 wherein the flour is present in an amount of 32 to 36% and the glass bubble microspheres are present in an amount of 10 to 15%.

14. A method of making a kneadable and moldable polymer composition comprising a matrix mixture of flour, water, a thickener, and lightweight hollow microspheres comprising:
    a) rapidly mixing a composition of flour, preservatives, colorants and a polysaccharide gum thickener at room temperature, to form a dispersed powdery mixture;
    b) subsequently adding water and lightweight microsphere fillers in an amount not to exceed 15% of the ultimate compositional weight to the agitated powdered mixture and heating the resulting aqueous mixture during mix agitation to between 180 to 200° F.; and c) continue mixing at the elevated temperature until formation of a uniform dough.

15. The method of claims 14 wherein the microspheres employed are glass bubble microspheres.

16. The method of claim 14 wherein the flour employed is wheat or wood flour employed in an amount of 30 to 40% by weight of the total composition.

17. The method of claims 14 wherein the water is employed in an amount of from about 30 to 40% by weight.

18. The method of claim 14 wherein the polysaccharide gum thickener is present in an amount of 1 to 5% of the total weight of the composition.

* * * * *